Patented July 4, 1939

2,164,826

UNITED STATES PATENT OFFICE 2,164,826

PURIFICATION OF IMPURE NOBLE METALS

Herbert Langwell, Epsom, and John Francis Short, Ewell, England

No Drawing. Application April 22, 1938, Serial No. 203,676. In Great Britain May 7, 1937

9 Claims. (Cl. 75—118)

This invention relates to the purification of impure noble metals.

In certain applications of noble metals, i. e. those metals which either do not oxidise when heated in air or oxygen, or which only oxidise superficially, it is desirable to remove small amounts of easily oxidisable metals existing in the form of impurities.

Impure noble metals can be purified by treating them as such in their metallic state but it is desirable in some cases to start from a salt of a noble metal and according to the present invention salts of impure noble metals are precipitated in the presence of an inert carrier, and the precipitate so obtained is separated, dried, and then ignited at a temperature at which the impurities are oxidised and the noble metal is obtained in metallic form, the oxidised impurity being removed by a suitable solvent. This method is particularly suitable for the production of silver of a high degree of purity for use as a catalyst in gas phase reactions, but it can also be applied to the preparation of other metals such as gold, platinum, palladium, and the like in the pure form.

As an example of carrying out the process as applied to silver, a solution of silver nitrate is added with stirring to an aqueous suspension of two equivalents of precipitated calcium carbonate. In this way a precipitate consisting of silver carbonate, calcium carbonate, carbonates of the metallic impurities associated with the silver, and excess calcium carbonate is obtained. This precipitate can be separated by filtration or any other suitable means, dried and heated in air to about 400° C. The silver carbonate is thereby reduced to metal while the carbonates of the metals constituting the impurities remain as such or change to oxides. The presence of an inert carrier, in this instance the calcium carbonate, prevents any sintering of the reduced silver. The mass obtained is now powdered and treated with a solvent for the metal oxides and carbonates present.

In the case of silver containing small amounts of lead and copper as impurities, we have found that acetic acid is a suitable solvent. The silver remains as a finely divided powder which contains only a few parts per million of impurities.

In place of calcium carbonate it is obvious that other inert carriers may be chosen as for example, magnesium carbonate, barium carbonate or strontium carbonate. Precipitation can, of course, be effected by a soluble precipitating agent in the presence of an inert carrier, e. g. one equivalent of sodium carbonate and one equivalent of calcium carbonate in place of the two equivalents of calcium carbonate aforementioned. The substances used as inert carrier must be easily removable from the reduced silver obtained on ignition, and must not react with the silver or other noble metal to be treated.

The particular solvent chosen will depend on the metal undergoing treatment and the nature of the impurities to be removed and must be such that it will readily attack and remove the impurities but have no substantial action on the noble metal undergoing purification. If desired, the precipitate after ignition may be treated successively with different solvents or with a mixture of solvents. Although the method has been particularly described for the treatment of silver, it may be modified by utilising suitable salts and suitable inert carriers to apply to other noble metals such as gold, platinum, palladium and the like. A particular application of purified noble metals obtained by the above process is as catalyst in gas phase reactions, since improved results are obtained in many instances by using catalysts of a high degree of purity. For example, silver catalysts prepared by the above process are extremely active in promoting oxidation reactions such as the oxidation of olefines to produce olefine oxides. It is, of course, to be understood, however, that the purified metals obtained according to this process can be used for all purposes for which a highly purified metal is desirable—for example in preparing chemically pure salts of noble metals.

What we claim is:

1. The method of preparing catalysts consisting of purified noble metals in finely divided form which consists in obtaining from a solution of a salt of the impure metal a precipitated reducible salt thereof in the presence of an eventually separatable inert carrier, drying the precipitated mass including the inert carrier, igniting the mass at a temperature at which the impurities are oxidised and the noble metal is obtained in reduced form, and then chemically removing the oxidised impurities and the residual inert carrier, leaving the purified metal in disintegrated form.

2. The method according to claim 1, in which a single substance is used in excess to serve as precipitating agent and also as inert carrier.

3. The method according to claim 1, in which a chemical solvent having no substantial action on the noble metal is used to dissolve out the impurities from the precipitate after ignition thereof.

4. The method according to claim 1, in which a mixture of chemical solvents having no substantial action on the noble metal is used to dissolve out the impurities from the precipitate after ignition thereof.

5. The method according to claim 1, in which a succession of chemical solvents having no substantial action on the noble metal is used to dissolve out the impurities from the precipitate after ignition thereof.

6. The method according to claim 1, in which in the case of silver a soluble silver salt solution is treated with excess of a suspension of a carbonate of a metal taken from the group consisting of calcium, barium, strontium and magnesium, whereby a precipitate mixture of silver carbonate and the carbonates of the impure metals present is formed in the presence of the residual unchanged carbonate acting as carrier, and in which the precipitate mixture is then separated dried and ignited and treated for the separation of the resultant impurity compounds from the residual finely divided silver.

7. The method of preparing catalysts consisting of purified silver in finely divided form from the impure metal, consisting in converting the metal to a salt solution, treating it with excess of a precipitating carbonate, separating the precipitate and excess carbonate, drying and igniting the same and separating the resultant finely divided silver from the impurities.

8. The method of preparing catalysts consisting of purified silver in finely divided form from the impure metal, consisting in converting the metal to a salt solution, treating it with a precipitating carbonate in the presence of a carbonate carrier for the precipitate, separating the precipitate and carrier, drying and igniting the same and separating the resultant finely divided silver from the impurities.

9. The method of preparing catalysts consisting of purified silver in finely divided form from silver containing copper and lead as impurities, consisting in converting the impure silver to a salt solution, treating it with a precipitating carbonate in the presence of a carrier for the precipitate, separating the precipitate, drying and igniting the same to reduce the silver carbonate to metallic silver, and treating the mixture after ignition with acetic acid to remove the lead and copper impurities.

HERBERT LANGWELL.
JOHN FRANCIS SHORT.